United States Patent
Sakurai et al.

(10) Patent No.: US 7,409,275 B2
(45) Date of Patent: Aug. 5, 2008

(54) VEHICLE DIAGNOSTIC SYSTEM

(75) Inventors: Kohei Sakurai, Hitachi (JP); Nobuyasu Kanekawa, Hitachi (JP); Minoru Ohsuga, Hitachinaka (JP); Masatoshi Hoshino, Tsuchiura (JP); Yoichi Iihoshi, Tsuchiura (JP); Yutaka Takaku, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/698,950

(22) Filed: Jan. 29, 2007

(65) Prior Publication Data

US 2007/0124039 A1 May 31, 2007

Related U.S. Application Data

(63) Continuation of application No. 11/252,892, filed on Oct. 19, 2005, now abandoned, which is a continuation of application No. 10/901,116, filed on Jul. 29, 2004, now abandoned, which is a continuation of application No. 10/196,206, filed on Jul. 17, 2002, now abandoned, which is a continuation of application No. 10/079,502, filed on Feb. 22, 2002, now abandoned.

(30) Foreign Application Priority Data

Mar. 1, 2001 (JP) ............................... 2001-56474

(51) Int. Cl.
*G01R 31/00* (2006.01)
*G07C 5/00* (2006.01)

(52) U.S. Cl. .......................... 701/31; 701/29; 340/438

(58) Field of Classification Search ............. 701/29–34; 340/438, 439
See application file for complete search history.

(56) References Cited

U.S. PATENT DOCUMENTS

| 5,734,322 | A | 3/1998 | Ishii et al. |
| 6,025,776 | A | 2/2000 | Matsuura |
| 6,061,614 | A | 5/2000 | Carrender et al. |
| 6,181,994 | B1 | 1/2001 | Colson et al. |
| 6,225,898 | B1 | 5/2001 | Kamiya |
| 6,263,268 | B1 | 7/2001 | Nathanson |
| 6,285,931 | B1 | 9/2001 | Hattori et al. |
| 6,370,449 | B1 | 4/2002 | Razavi et al. |
| 6,438,471 | B1 | 8/2002 | Katagishi et al. |
| 2002/0082755 | A1 | 6/2002 | Tanaka |

FOREIGN PATENT DOCUMENTS

| JP | 7-50886 | 2/1995 |
| JP | 11-255078 | 9/1999 |
| JP | 11-326140 | 11/1999 |

*Primary Examiner*—Thomas G. Black
*Assistant Examiner*—Lin B. Olsen
(74) *Attorney, Agent, or Firm*—Dickstein Shapiro LLP

(57) ABSTRACT

The present invention provides a vehicle diagnostic system comprising an electronic control unit for controlling and monitoring vehicle equipment, a radio communication means for transmitting a vehicle diagnostic information to a telecommunication equipment located outside the vehicle or for communicating between the vehicle and the telecommunication equipment located outside the vehicle and for transmitting a communication diagnostic signal to the electronic control unit and receiving a response signal to the communication diagnostic signal, and a communication line for connecting the electronic control unit and the radio communication means wherein the response signal is utilized to determine if the communication line is properly functional.

19 Claims, 16 Drawing Sheets

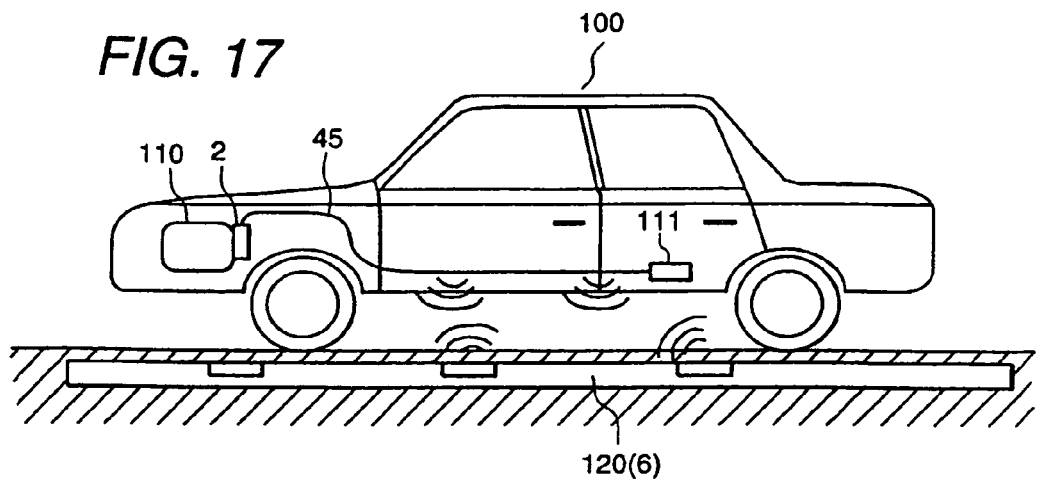
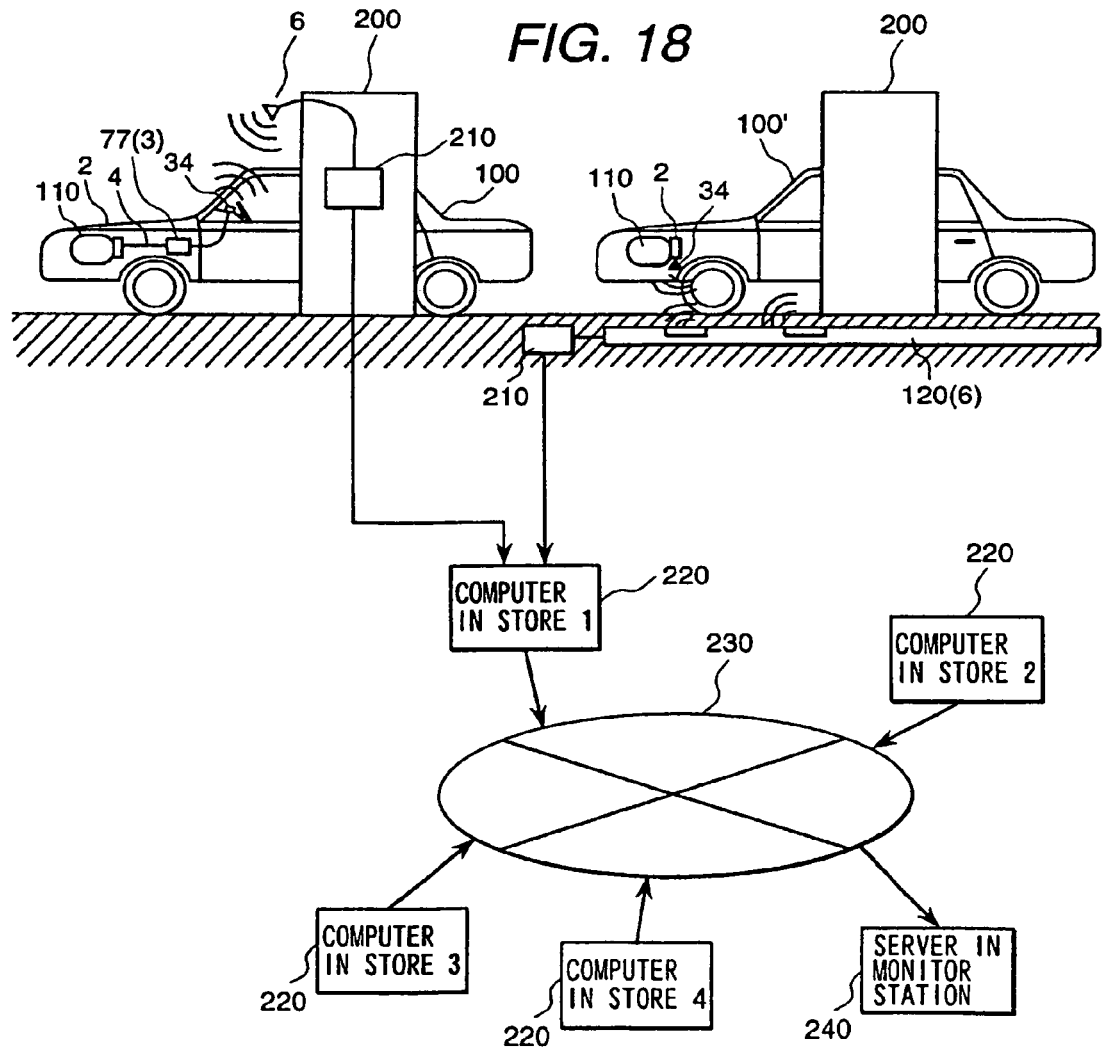

VEHICLE DIAGNOSTIC SYSTEM

CROSS-REFERENCE TO RELATED APPLICATIONS

This application is a continuation of U.S. patent application Ser. No. 11/252,892, filed on Oct. 19, 2005, now abandoned which in turn was a continuation of U.S. patent application Ser. No. 10/901,116, filed on Jul. 29, 2004, now abandoned which in turn was a continuation of U.S. patent application Ser. No. 10/196,206, filed on Jul. 17, 2002, now abandonded and which in turn was a continuation of U.S. patent application Ser. No. 10/079,502, filed on Feb. 22, 2002 now abandonded. The subject matters of all are incorporated in their entirety by reference herein.

FIELD OF THE INVENTION

The present invention relates to a diagnostic system in a vehicle such as an automobile, and more specifically, to a vehicle diagnostic system that transmits a diagnostic information or signal of a vehicle by means of radio communication.

DISCUSSION OF THE RELATED ART

Vehicle diagnosis pertains to self-diagnosis of an abnormality of an engine, a transmission, and the like. The OBD II (On-Board Diagnosis II) system of the United States is one example of this vehicle diagnostic system. The system is particularly suited to detecting deterioration in exhaust emissions using an engine electronic control unit, and then notifying the vehicle user of the failure. The diagnostic information at this time is stored in a memory in the engine ECU as a code corresponding to the failure. The diagnostic information can be read by connecting an external scan tool to the engine ECU via a diagnosis connector at a repair shop. In the repair shop, repair in response to the failure code is performed.

Currently, for reducing diagnostic costs and shortening a period from failure to repair, an OBD III system, which is a system further developed from the OBD II system, is being reviewed by the California atmospheric resource bureau in the United States. The OBD III system is characterized in that a monitor station, base station (collectively refer to as "telecommunication equipment") and the like, automatically collects diagnostic information radio-transmitted from each vehicle. In this regard, the integrity of the diagnostic information becomes crucial. Unfortunately, either through vehicle operator's manipulation or diagnostic system failure, the diagnostic information is not always accurate.

Conventionally, a mechanism to judge whether or not vehicle diagnostic information is correctly transmitted toward a telecommunication equipment is both costly and unreliable due to the numerous components necessitated by previous systems.

SUMMARY OF THE INVENTION

The present invention provides a vehicle diagnostic system capable of transmitting diagnostic information or signal of a vehicle to outside of the vehicle by means of radio communication like OBD III, detecting abnormality of the vehicle diagnostic system, which is caused by a failure of the vehicle diagnostic system itself or by manipulation of a vehicle operator and notifying the vehicle operator and/or a telecommunication equipment about the abnormality of the vehicle diagnostic system. In addition, the present invention provides a vehicle diagnostic system at low cost without newly adding a dedicated radio communication means for transmitting diagnostic information or signal of a vehicle to a telecommunication equipment by means of radio communication. In this way, it becomes possible to produce vehicles, which support OBD III, and the like, while minimizing costs.

In an object of the present invention a vehicle diagnostic system is provided comprising an electronic control unit for controlling and monitoring vehicle equipment, a radio communication means for transmitting a vehicle diagnostic information to a telecommunication equipment located outside the vehicle or for communicating between the vehicle and the telecommunication equipment located outside the vehicle and for transmitting a communication diagnostic signal to the electronic control unit and receiving a response signal to the communication diagnostic signal, and a communication line for connecting the electronic control unit and the radio communication means wherein the response signal is utilized to determine if the communication line is properly functional.

In another object of the present invention a vehicle diagnostic system is provided comprising an electronic control unit for controlling and monitoring vehicle equipment, a radio communication means for transmitting a vehicle diagnostic information to a telecommunication equipment located outside the vehicle or for communicating between the vehicle and the telecommunication equipment located outside the vehicle, and a communication line for connecting the electronic control unit and the radio communication means; wherein the transmitted vehicle diagnostic information is returned back to the radio communication means by the telecommunication equipment located outside the vehicle and compared to the vehicle diagnostic information stored in the electronic control unit to determine if the radio communication means is properly functional.

In yet another object of the present invention a vehicle diagnostic system is provided comprising an electronic control unit for controlling and monitoring vehicle equipment, a radio communication means for transmitting a vehicle diagnostic information to a telecommunication equipment located outside the vehicle or for communicating between the vehicle and the telecommunication equipment located outside the vehicle, and a communication line for connecting the electronic control unit and the radio communication means; wherein the radio communication means transmits or receives information other than the vehicle diagnostic information.

BRIEF DESCRIPTION OF THE DRAWINGS

The above advantages and features of the invention will be more clearly understood from the following detailed description which is provided in connection with the accompanying drawings.

FIG. 17 is a schematic diagram illustrating a vehicle which is equipped with the vehicle diagnostic system of FIG. 16; and FIG. 18 is a schematic diagram in which vehicle diagnostic information is transmitted from a vehicle, which is equipped with a vehicle diagnostic system of the present invention for performing short-distance communication to a base station, a monitor station, or the like.

DETAILED DESCRIPTION OF THE INVENTION

Figure 1:
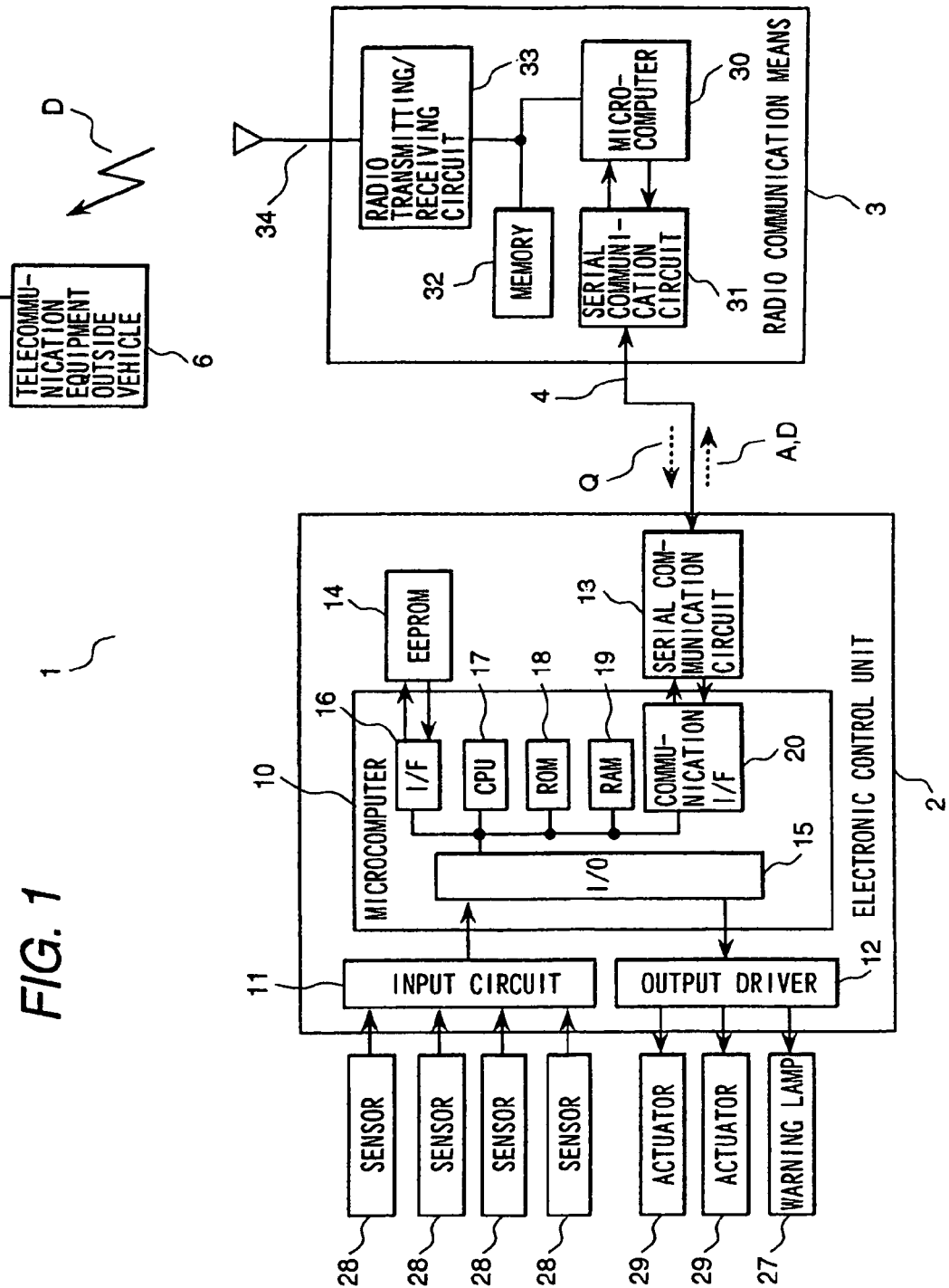
FIG. 1 illustrates a vehicle diagnostic system according to the first embodiment of the present invention.

Exemplary embodiment of the present invention will be described below in connection with the drawings. Other embodiments may be utilized and structural or logical changes may be made without departing from the spirit or scope of the present invention. Like items are referred to by like reference numerals throughout the drawings.

Referring now to the drawings, the vehicle diagnostic system 1 of FIG. 1 comprises an electronic control unit 2, a radio communication means 3, and a serial communication line 4 that is connected between the electronic control unit 2 and the radio communication means 3. In this case, an electronic control unit is a control unit that controls various kinds of vehicle equipment including an engine, an automatic transmission, and a break, and that diagnoses the vehicle equipment. The radio communication means is a device that has a radio transmission circuit and/or a radio receiving circuit, and an antenna.

In the electronic control unit 2, signals of various sensors 28 are inputted to an I/O 15 of a microcomputer 10 via an input circuit 11 and in response to the input signals, a CPU 17 of the microcomputer 10 performs an operation according to a control program that is stored in a ROM 18. Then, the most appropriate signal is transmitted to an output driver 12 via the I/O 15 and the output driver 12 drives various actuators 29.

Here, while a vehicle is traveling, the microcomputer 10 of the electronic control unit 2 controls the vehicle equipment as described above. At this time, the microcomputer 10 also diagnoses a state of the vehicle equipment according to information obtained from diagnostic signals in relation to states of the various sensors 28 and states of the actuators 29 of the output driver 12, and stores the diagnostic information in a RAM 19 as a code corresponding to a diagnostic result. When a failure occurs, the microcomputer 10 lights up a warning lamp 27 to inform a vehicle user that the failure has occurred, and to request the vehicle user to carry out repairs. Then, the microcomputer 10 transmits vehicle diagnostic information D, which is the diagnostic information of the vehicle equipment stored in the RAM 19, to the radio communication means 3 through the serial communication line 4.

The radio communication means 3 modulates by the frequency the vehicle diagnostic information D using a radio transmitting/receiving circuit 33, and then radio-transmits the modulated vehicle diagnostic information D as a diagnostic information signal from an antenna 34 to telecommunication equipment or a base station 6 (hereinafter referred to as telecommunication equipment).

In this manner, when a failure occurs in the vehicle equipment, a status of the vehicle equipment, which has been diagnosed by the electronic control unit 2, can be radio-transmitted to the telecommunication equipment 6 as diagnostic information of the vehicle equipment. The diagnostic information of the vehicle equipment includes means the diagnostic code and a vehicle code (VIN) specific to each vehicle.

In this connection, not only in a case where a failure occurs in the vehicle equipment as described in this embodiment, but also in a state in which there is no failure, the diagnostic information may be always radio-transmitted to the telecommunication equipment 6 at certain time intervals. In addition, when receiving a diagnostic information request signal of the telecommunication equipment 6 as a radio signal, said diagnostic information may be radio-transmitted to the telecommunication equipment 6 in response to this request. Unless otherwise specified, each embodiment is described assuming that said diagnostic information is automatically transmitted when a failure occurs in the vehicle equipment.

The vehicle diagnostic system 1 of this embodiment has a function of checking whether or not communication between the radio communication means 3 and the electronic control unit 2 is being performed normally. Specifically, the radio communication means 3 transmits a communication diagnostic signal Q to the electronic control unit 2 as necessary and in response to it, the electronic control unit 2 sends back a response signal A to the radio communication means 3. Then, the radio communication means 3 decrypts or utilizes this response signal A and determines whether or not the communication is being performed normally. In other words, whether the communication line 4 is properly functional.

As the communication diagnostic signal Q, for example, an instruction for performing an operation of a plurality of numerical values appropriately, a different rolling code for each transmission, and the like, may be used. In the case of the former, the electronic control unit 2 performs a specified operation. In the case of the latter the electronic control unit 2 searches an appropriate code from among a plurality of codes stored in an EEPROM 14, and sends the code back to the radio communication means 3. Next, the radio communication means 3 determines normality or abnormality of the communication by comparing the code with a fixed value stored in a memory 32. If the radio communication means 3 judges that the communication is not being performed normally, the radio communication means 3 lights up a warning lamp, or takes other actions, in order to warn the vehicle user of abnormality of the vehicle diagnostic system and thereby requests the vehicle user or operator to repair the vehicle diagnostic system and at the same time, the radio communication means 3 also reports to the telecommunication equipment 6.

Figure 2:
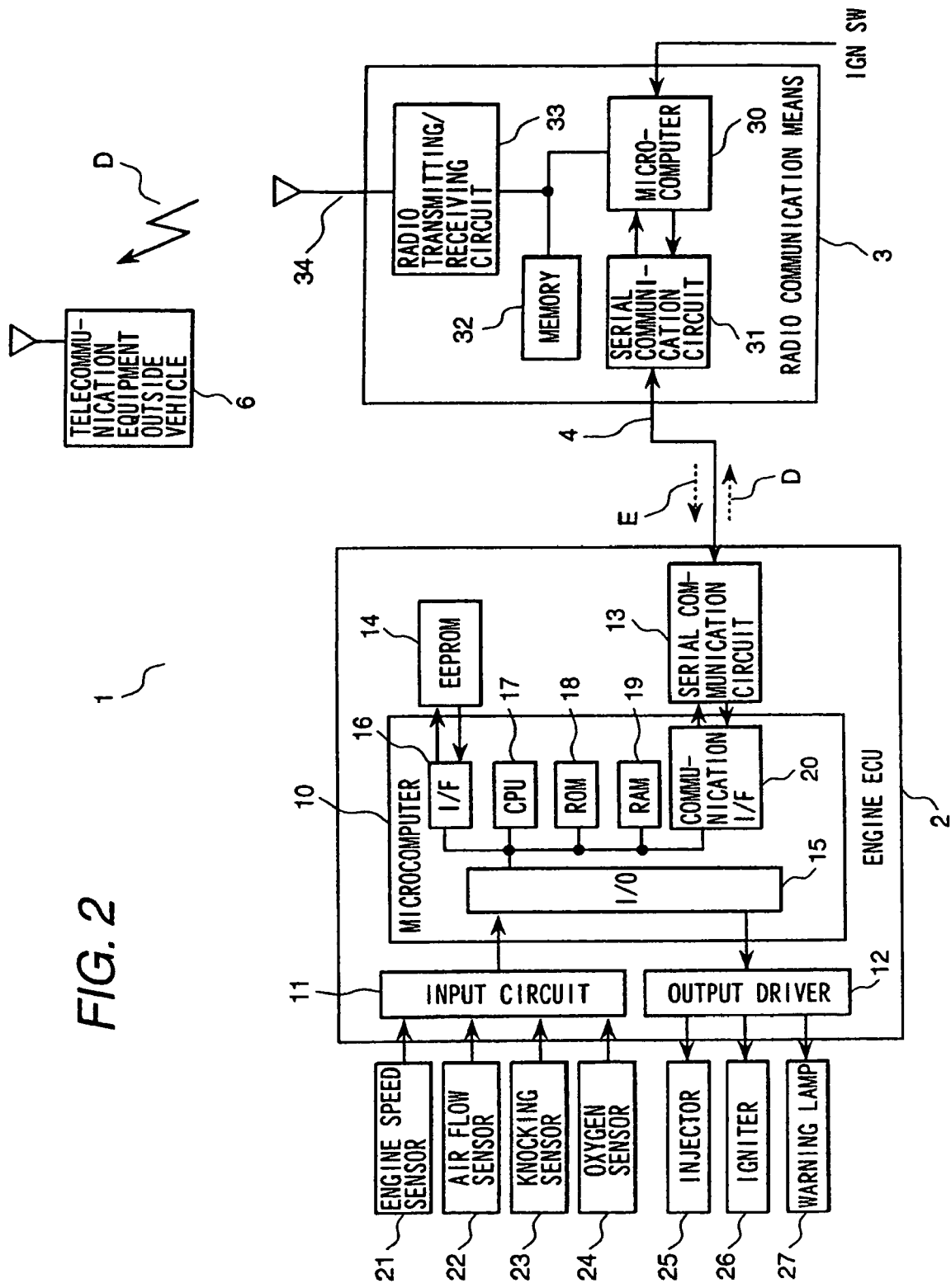
FIG. 2 illustrates a vehicle diagnostic system according to the second embodiment of the present invention.

Referring now to FIG. 2, it is assumed that the electronic control unit 2 is an engine ECU for controlling fuel injection, ignition, and the like, of a vehicle's engine. The vehicle diagnostic system is configured to carry out a function of stopping the engine to prevent undue influence in the event that communication between the radio communication means 3 and this engine ECU 2 is not normally performed.

The engine ECU 2 inputs signals from a engine speed sensor 21 for measuring an engine speed, an air flow sensor 22 for measuring a quantity of intake air into the engine, a knocking sensor 23 for detecting flame-out of the engine, an oxygen sensor 24 for measuring oxygen concentration in exhaust gasses, and the like, to the I/O 15 of the microcomputer 10 via the input circuit 11. In response to the input signals, the CPU 17 of the microcomputer 10 performs an operation according to a control program that is stored in the ROM 18. Then, the CPU 17 transmits the most appropriate control signal to the output driver 12 via the I/O 15. After that, this output driver 12 drives an injector 25 and an igniter 26, and the like, which are actuators.

In this case, concerning a method for transmitting the vehicle diagnostic information D to the telecommunication equipment outside vehicle 6 in the event of a failure in the vehicle equipment is the same as that described in the first embodiment. Additionally, in this embodiment, an ignition switch (IGN SW) signal, which notifies the radio communication means 3 of ON or OFF of an ignition key, is inputted. When this ignition key becomes ON, transmitting an engine-operation enable signal E to the engine ECU 2 by the radio communication means 3 permits the engine to start. Also, the above-mentioned rolling code may be used as the engine-operation enable signal E. In this case, the engine ECU 2 compares the transmitted code with an appropriate code from among a plurality of codes stored in the EEPROM 14. As a result of the comparison, only when both codes are the same, the engine ECU 2 drives the injector 25 and the igniter 26 to start the engine.

Figure 3:
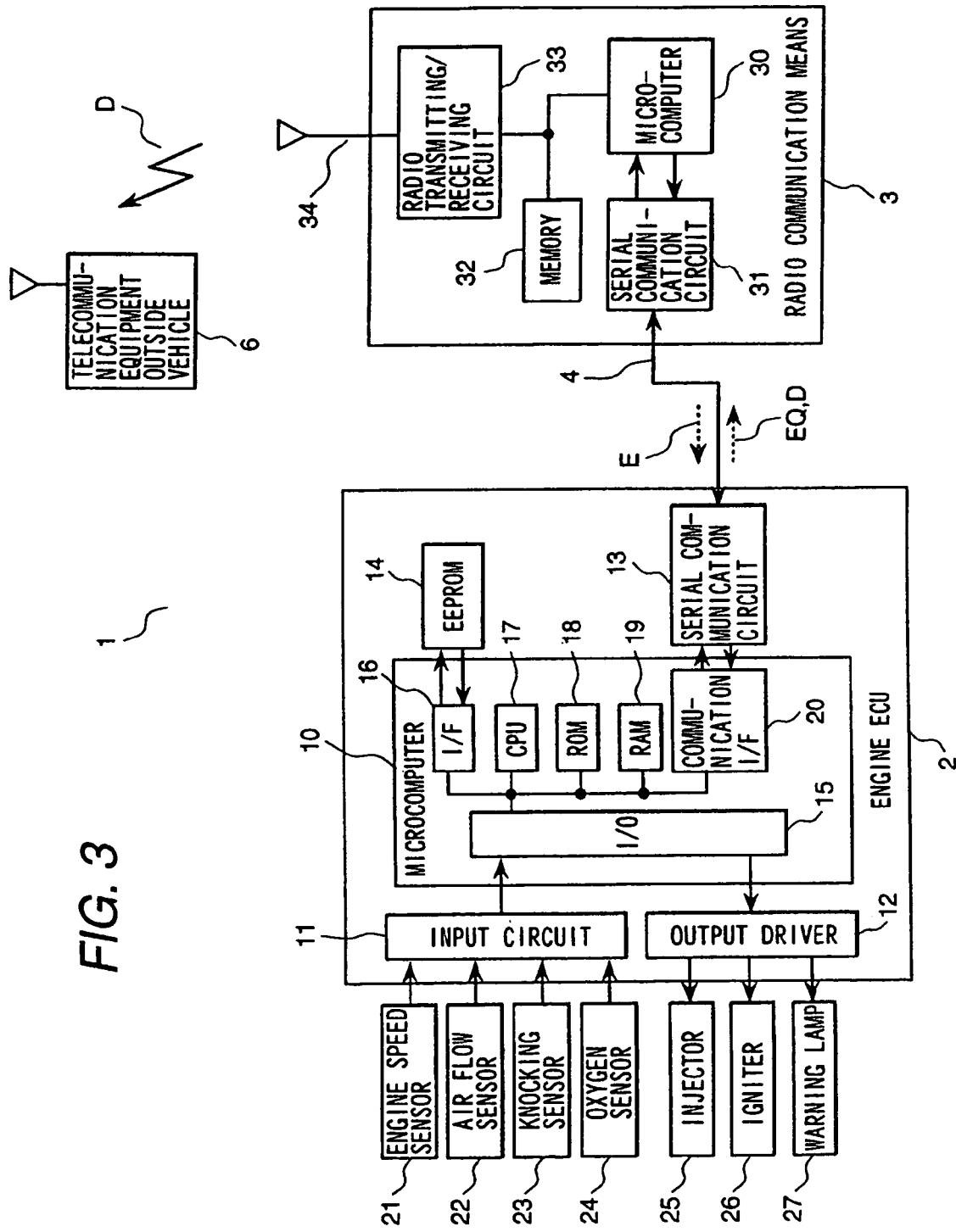
FIG. 3 illustrates a vehicle diagnostic system according to the third embodiment of the present invention.

Beyond the method for inputting the ignition switch (IGN SW) signal to the radio communication means 3, as shown in the third embodiment of FIG. 3, after starting the engine, the engine ECU 2 transmits an engine-operation enable request signal EQ to the radio communication means 3 and continues the engine operation by receiving an engine-operation enable signal E from the radio communication means 3. In this case, after transmitting the engine-operation enable request signal EQ, if the engine-operation enable signal E is not returned within a predetermined period of time, the engine is stopped. In addition, transmitting an engine-operation disable signal to the engine ECU 2 by the radio communication means 3 may also disable the vehicle from traveling.

Figure 4:
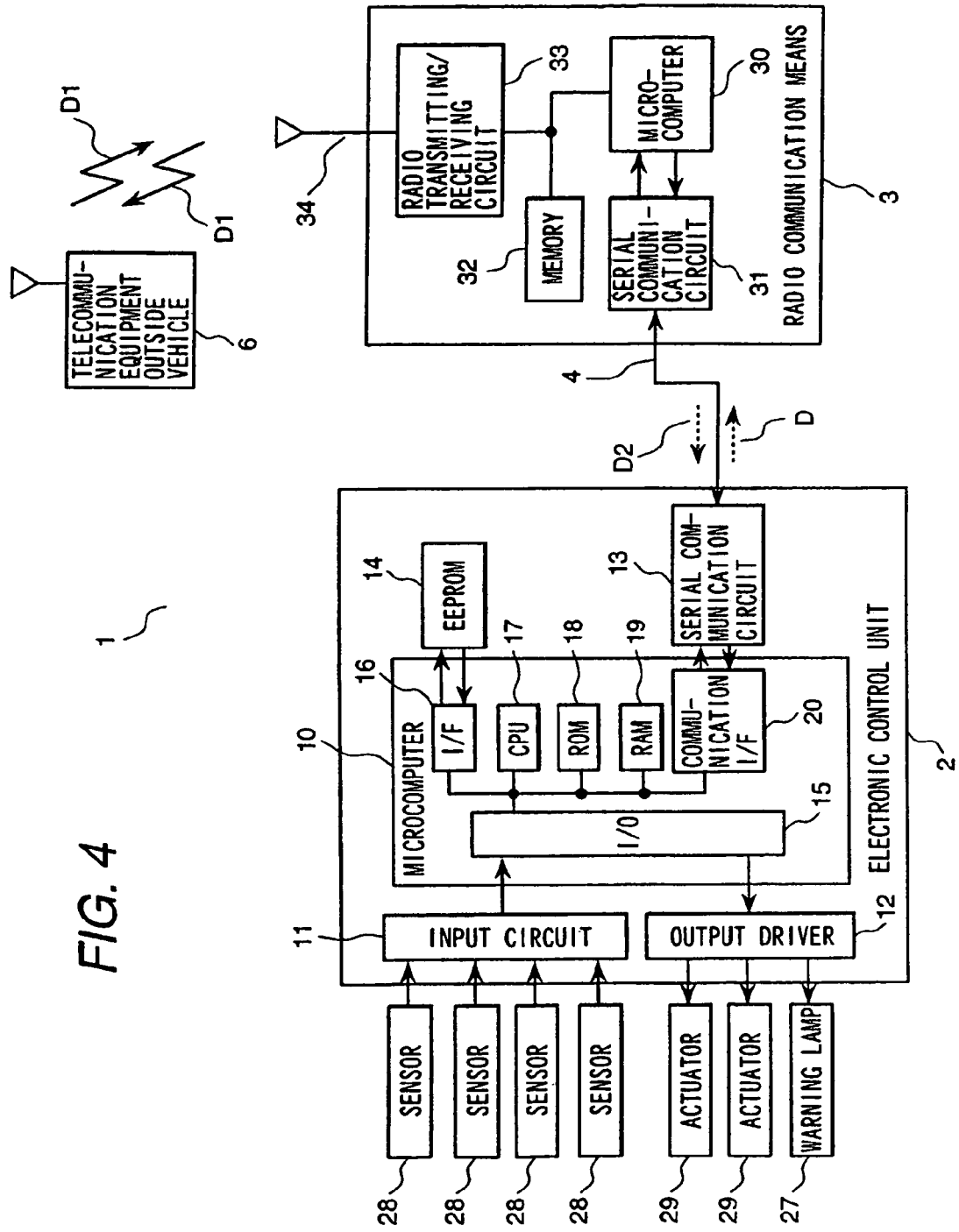
FIG. 4 illustrates a vehicle diagnostic system according to the fourth embodiment of the present invention.

In FIG. 4, if a failure of the vehicle equipment occurs, the electronic control unit 2 stores vehicle diagnostic information D in the RAM 19, and transmits the vehicle diagnostic information D to the radio communication means 3. Then, the radio communication means 3 radio-transmits vehicle diagnostic information D1 to the telecommunication equipment 6. When receiving the diagnostic information D1, the telecommunication equipment 6 sends vehicle diagnostic information D1, which is the same as the received diagnostic information D1, back to the radio communication means 3 of the vehicle.

The radio communication means 3 transmits the diagnostic information to the electronic control unit 2. After that, the electronic control unit 2 compares diagnostic information D2, which has been transmitted, with the transmitted diagnostic information, in other words, with the vehicle diagnostic information D stored in the RAM 19 to check whether or not the radio communication means 3 is properly functional.

Also, even if communication between the electronic control unit 2 and the radio communication means 3 is not normal due to a breakage of the serial communication line 4, or the like, it is judged that the radio communication means 3 is abnormal. Hence, whether or not the communication between the electronic control unit 2 and the radio communication means 3 is being performed normally, is checked by using for the communication diagnostic signal Q and the response signal A as described in the first embodiment.

In this embodiment, in the event of a failure in the antenna 34, if the antenna 34 is removed on purpose, if shielding the antenna 34 causes the communication to become disabled, or if data is overwritten when transmitting the data to the telecommunication equipment 6, then the diagnostic information D2 is not received within a predetermined period of time, or the diagnostic information D is varied from the diagnostic information D2. As a result, the electronic control unit 2 judges that the radio communication means 3 is abnormal. The electronic control unit 2, therefore, warns the vehicle user of abnormality of the vehicle diagnostic system by lighting up the warning lamp 27, and thereby requests the vehicle user to repair the vehicle diagnostic system.

Figure 5:
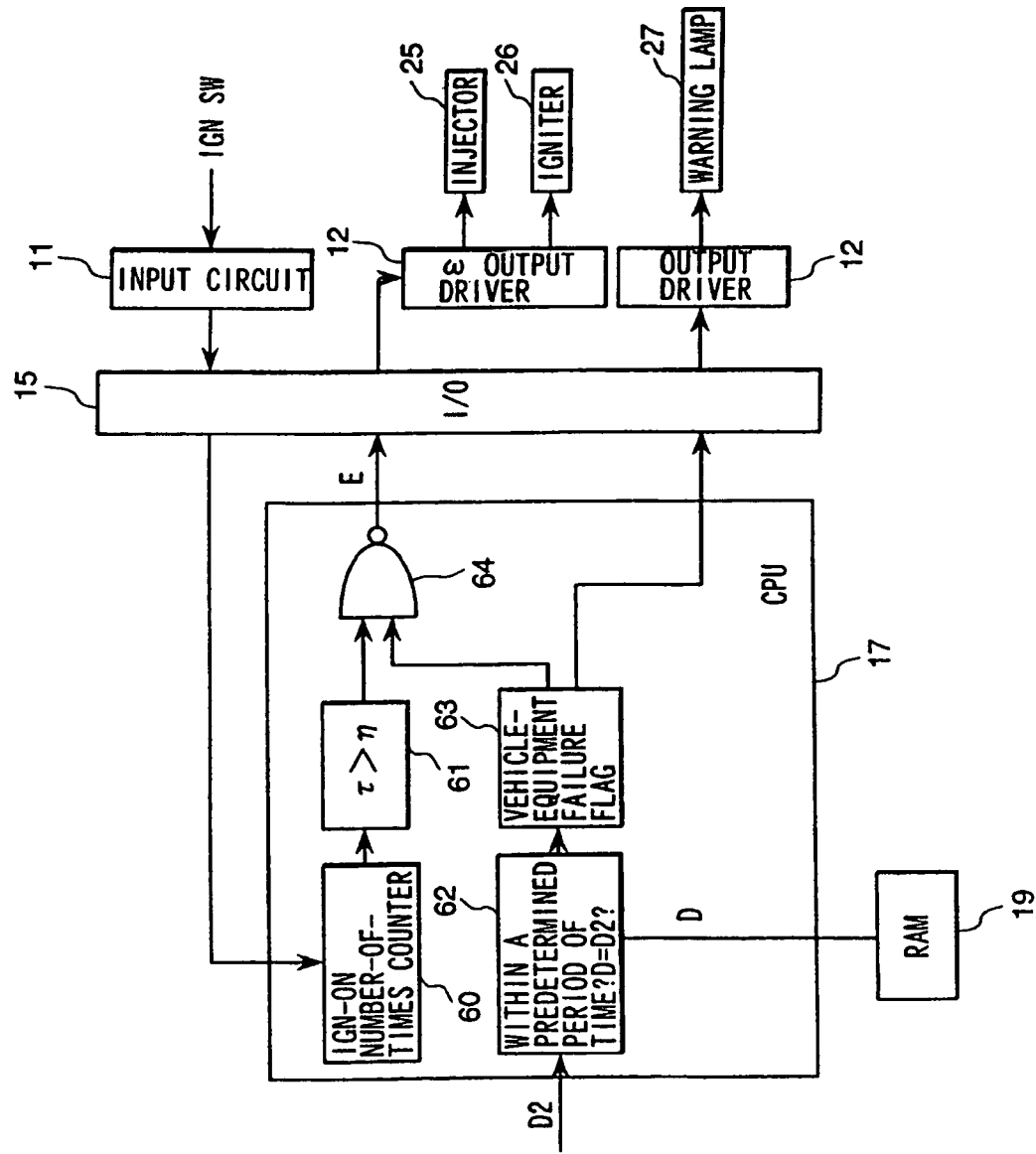
FIG. 5 is a block diagram for stopping an engine in a case where a vehicle user does not carry out repair or improvement within a predetermined period of time in the vehicle diagnostic system of FIG. 4.

Here, as opposed to the first embodiment, if a failure occurs in the radio communication means 3, the failure cannot be reported to the telecommunication equipment 6. Hence, even a defective vehicle is continuously allowed to travel without penalty and the like. FIG. 5 shows an embodiment configured to prevent this problem from occurring.

In FIG. 5, if the CPU 17 in the microcomputer 10 of the electronic control unit 2 judges that a failure has occurred in the vehicle equipment, the CPU 17 sets a flag of a vehicle-equipment failure flag setting means 63 to 1 (high signal), and at the same time lights up the warning lamp, 27. A comparator 62 compares the diagnostic information D, which is stored in the RAM 19, with the diagnostic information D2 that has been sent back from the telecommunication equipment 6, as described above. Only if D is equivalent to D2, the comparator 62 clears the flag of the vehicle-equipment failure flag setting means 63 so that the flag becomes 0 (low signal). On the other hand, if D is not equivalent to D2, or if D2 is not returned within a predetermined period of time, the flag of the vehicle-equipment failure flag setting means 63 is kept as 1. Moreover, an IGN-ON counter 60 counts a number of times engine starts t by monitoring the ignition switch (IGN SW) signal that indicates ON or OFF of the ignition key. The comparator 61 judges whether or not the number of times engine starts t has exceeded a given value n. If the number exceeds the given value, the comparator 61 outputs 1.

After that, if the flag of the vehicle-equipment failure flag setting means 63 is 1, and if the comparator 61 judges that the number of times engine starts t has exceeded the given value n, a NAND circuit 64 outputs 0. Then, this output signal E is inputted to an enable terminal of the output driver 12 that drives the actuators 29 such as the injector 25 and the igniter 26. As a result, the output driver 12 is always OFF, which stops the engine disabling the vehicle from traveling. Also, if a polarity of the enable terminal of the output driver 12 is reverse, an AND circuits 64 is used.

In this manner, the engine can be stopped if the vehicle user does not carry out repair or improvement in a given period of time that has elapsed since the failure of the vehicle equipment occurred. Although this embodiment is adapted to the case where abnormality of the radio communication means 3 continues, it is also possible to configure the radio communication means 3 to have the function of this embodiment so as to stop the engine in a similar manner if the state, in which communication between the electronic control unit 2 and the radio communication means 3 is not normal, continues.

Hence, according to the first and the fourth embodiment, it is possible to detect a failure or abnormality of the vehicle diagnostic system like OBD III, which transmits diagnostic information of the vehicle equipment by radio communication, by checking whether or not communication between the electronic control unit 2 and the radio communication means 3 is being performed normally, or by checking whether or not the radio communication means 3 is normal.

In addition, according to the second, the third, and the fourth embodiment, it is possible to prevent the engine from starting to disable the vehicle from traveling if the vehicle user refuses to transmit the diagnostic information of the vehicle equipment in spite of a failure in the vehicle equipment or destroys the vehicle diagnostic system purposely. For example, if the operator causes undue influence, such as breaking the communication line between the electronic control unit 2 and the radio communication means 3 or removing or shielding the antenna 34 of the radio communication means 3 or overwriting the diagnostic information of the vehicle equipment.

In this manner, according to these embodiment, it is possible to identify a vehicle, which increases exhaust emission in exhaust gasses, without fail in order to request the vehicle user to repair the vehicle at an early stage, and in order to disable the vehicle, for which the fraud is carried out, from traveling. Hence, air environmental protection, which is the purpose of the vehicle diagnostic system like OBD III, can be achieved. Also, the embodiments of the present invention does not require the addition of special hardware for detecting a failure or abnormality of the vehicle diagnostic system. Therefore, the above-mentioned effects can be achieved at a low cost. Moreover, as shown in the fourth embodiment, the communication line 4 between the electronic control unit 2 and the radio communication means 3 is used for checking whether or not diagnostic information transmitted from the electronic control unit 2 is correctly transmitted to the telecommunication equipment 6. Hence, regardless of installed locations of the electronic control unit and the radio communication means, a failure and abnormality of the radio communication means can be detected.

Figure 6:
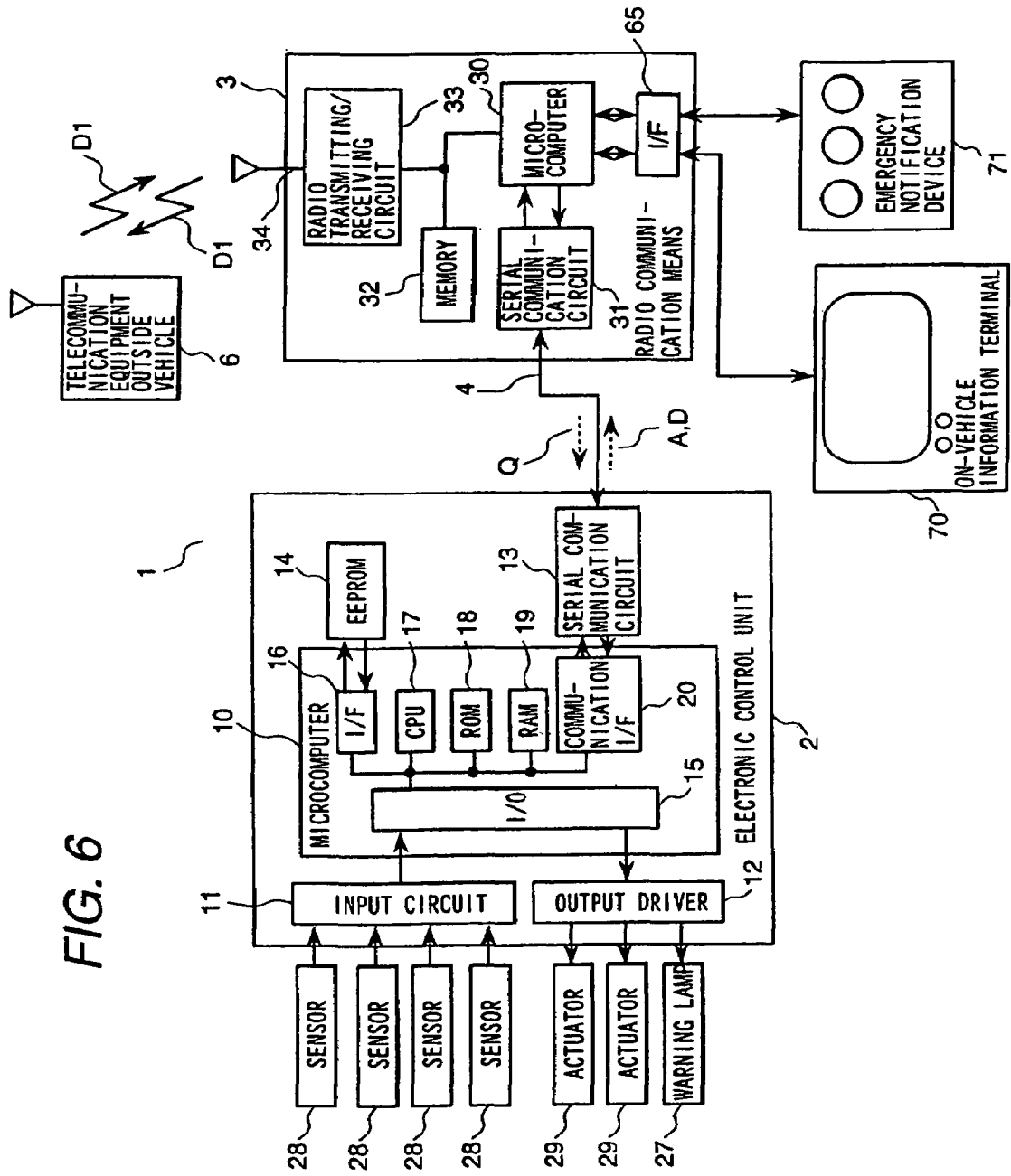
FIG. 6 illustrates a vehicle diagnostic system according to the fifth embodiment of the present invention.

In FIG. 6, as the radio communication means 3, this embodiment uses a radio communication means contained in on-vehicle information equipment. In FIG. 6, an on-vehicle information terminal 70 and an emergency notification device 71 in a driver's seat area exchanges information I other than diagnostic information of the vehicle equipment with the telecommunication equipment 6 located at the service center, or the like, through the radio communication means 3. For example, when a driver wants to look for a restaurant near from a location where the driver is now traveling, a map to the restaurant is displayed on-screen of the on-vehicle information terminal 70 by requesting the telecommunication equipment 6 at the service center or the like, to provide the information. In addition, in case of emergency including a failure causing an accident or affecting vehicle's traveling or a health condition of the driver, the driver can send a request for help to the telecommunication equipment outside vehicle 6 at the service center, or the like, by pressing a button of the emergency notification device 71.

In this embodiment, the radio communication means 3 contained in such existing on-vehicle information equipment is connected with the electronic control unit 2, and vehicle diagnostic information D of the vehicle equipment at the time of the failure is transmitted from this radio communication means 3 to the telecommunication equipment 6. In this connection, the vehicle diagnostic information D may be transmitted to the radio communication means 3 through the on-vehicle information terminal 70.

In addition, the radio communication means 3 transmits a communication diagnostic signal Q to the electronic control unit 2 as necessary and in response to this signal, the electronic control unit 2 sends back a response signal A.

Figure 7:
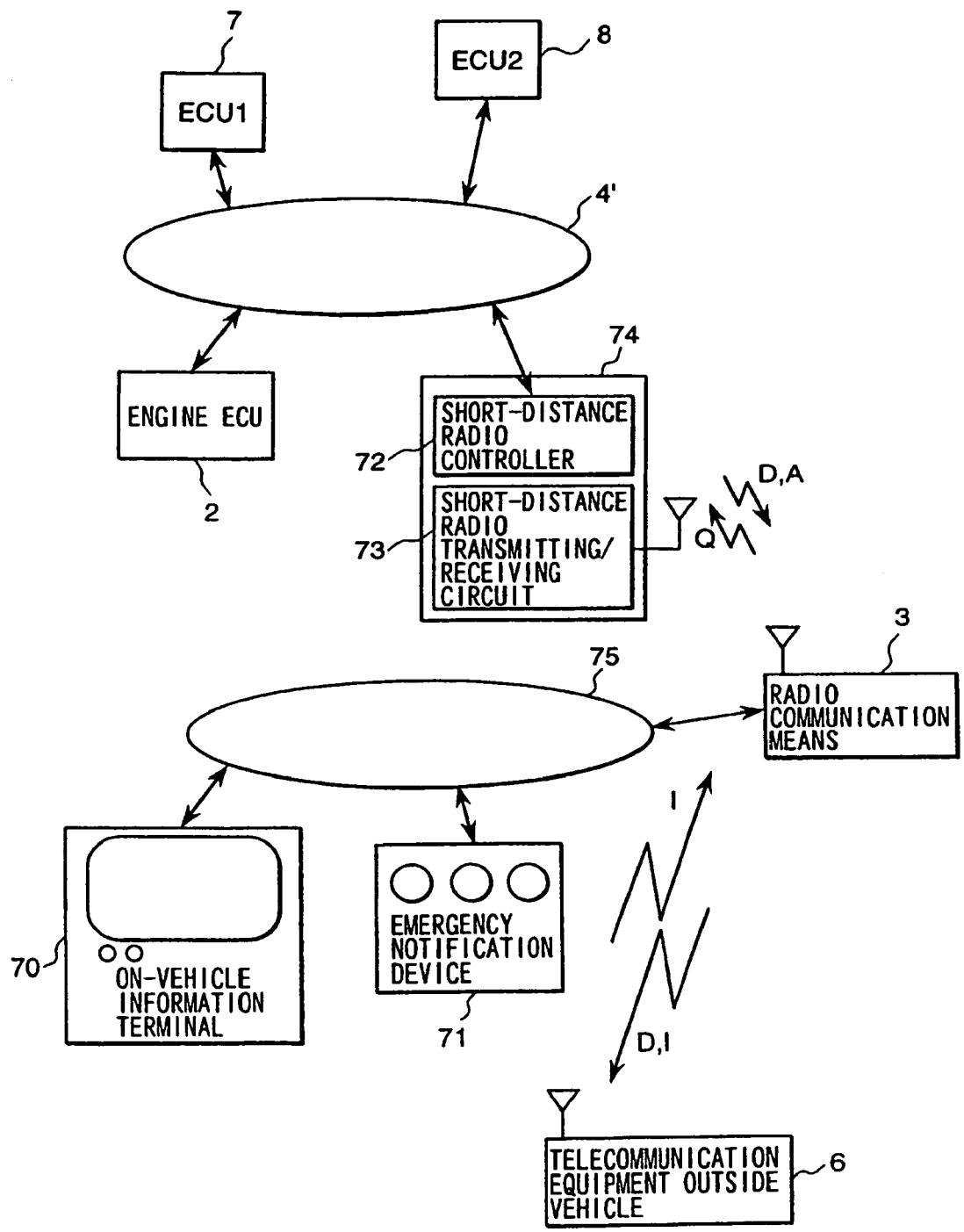
FIG. 7 illustrates a vehicle diagnostic system according to the sixth embodiment of the present invention.

In FIG. 7, vehicle diagnostic information is radio-transmitted to the telecommunication equipment 6 using the radio communication means contained in the on-vehicle information equipment. However, communication between the electronic control unit and the radio communication means is performed by cable and by means of radio communication.

Specifically, the engine ECU 2, a first ECU (for example, ECU for air bag control) 7, a second ECU (for example, ECU for transmission control) 8, a short-distance radio transmit-receive device 74 are connected each other through a control system LAN inside vehicle. For example, they are mutually connected through a multiple communication line 4' such as CAN (Controller Area Network). The short-distance radio transmit-receive device 74 comprises a transmit-receive controller 72 and a transmit-receive circuit 73.

In addition, the radio communication means 3 is mutually connected to the on-vehicle information terminal 70, the emergency notification device 71, and the like, through an information system LAN inside vehicle 75, and exchanges the information I other than the diagnostic information of the vehicle equipment with the telecommunication equipment outside vehicle 6 at the service center, or the like, through the radio communication means 3. The vehicle diagnostic information D from the various ECUs 7 and 8 is transmitted to the short-distance radio transmit-receive device 74 through the control system LAN inside vehicle 4'. Then, the vehicle diagnostic information D is radio-transmitted from the short-distance radio transmit-receive device 74 to the radio transmission means 3. After that, the radio transmission means 3 radio-transmits the diagnostic information, which has been transmitted, to the telecommunication equipment 6. As the short-distance radio transmit-receive device 74, for example, a Bluetooth module, and the like, may be used.

Figure 8:
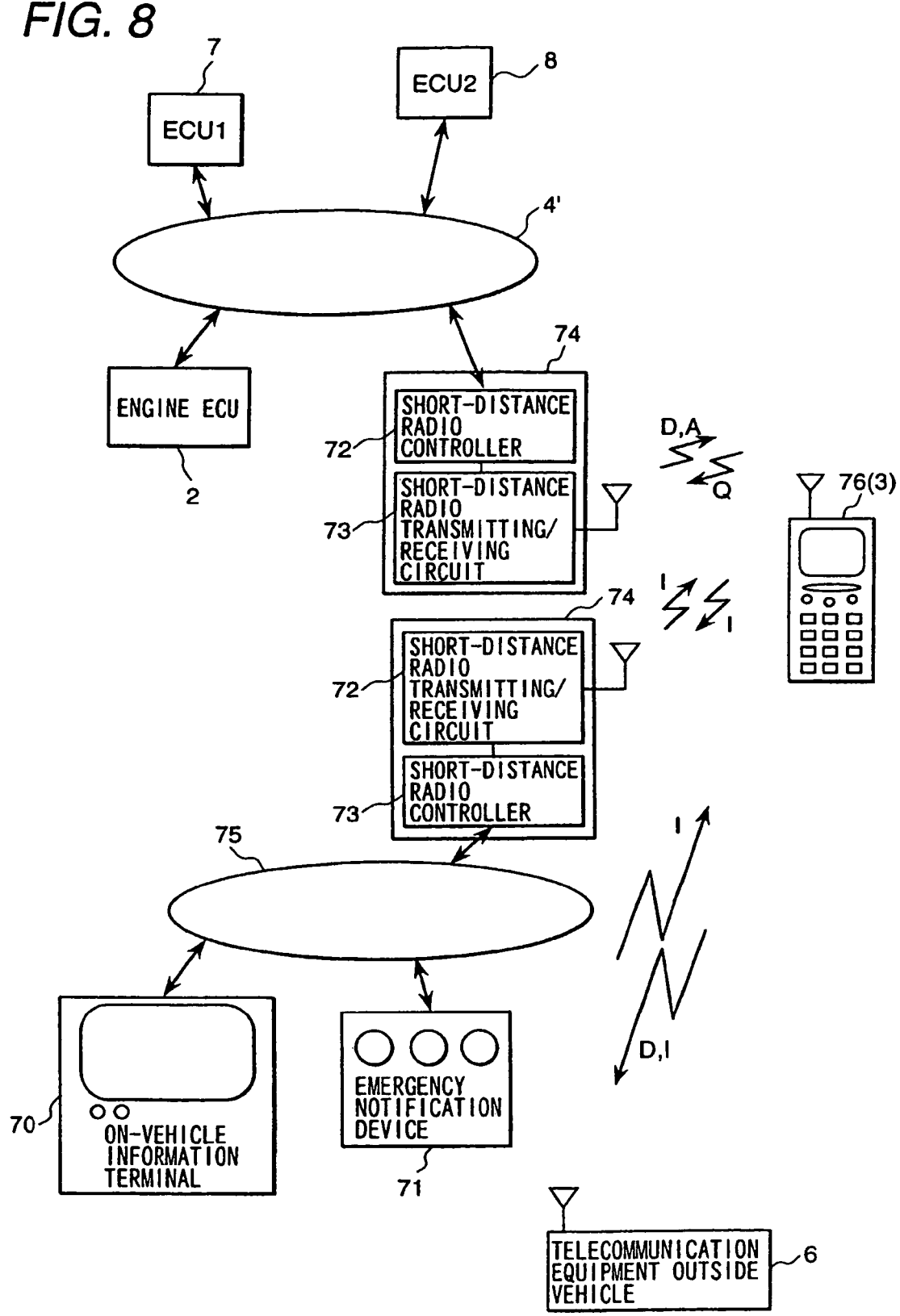
FIG. 8 illustrates a vehicle diagnostic system according to the seventh embodiment of the present invention.

On the other hand, as the radio communication means, as shown in the seventh embodiment of FIG. 8, not the radio communication means contained in the vehicle information equipment, but the radio communication means 3 contained in a cellular phone 76 may be used. In this case, it is required to connect the short-distance radio transmit-receive device 74 not only to the control system LAN 4' but also to the information system LAN 75 to perform communication with the cellular phones 76. However, only one short-distance radio transmit-receive device 74 is sufficient if one LAN inside vehicle is constructed by connecting between the control system LAN 4' and the information system LAN 75. Also, although it is not shown in the figure, as the cellular phone 76, besides the radio communication means 3 for communicating with the telecommunication equipment outside vehicle 6, the one in which the short-distance radio transmit-receive device is built into is used. In each of the sixth and the seventh embodiment, as described in the first embodiment, there is a function of checking whether or not communication between each electronic control unit and the radio communication means is normal.

In addition to the effects described in from the first to the fourth embodiment, all of the embodiments have an effect of constructing a vehicle diagnostic system, which transmits the diagnostic information of the vehicle equipment to outside of the vehicle by means of radio communication such as OBD III, at low cost. That is because the existing radio communication means in the vehicle is used for radio transmission of the diagnostic information of the vehicle equipment, and thereby the line used for information other than the diagnostic information is also used for the diagnostic information as the same hardware, which eliminates the need for a new radio communication means.

Moreover, for the purpose of reducing vehicle assembly man-hour and reducing cost and weight of a signal harness, the electronic control unit is installed not in a conventional driver's seat area but in a location near from the vehicle equipment, which is controlled and diagnosed. In other words, the electronic control unit is installed in the engine room. But, the radio communication means of the on-vehicle information equipment is generally installed in the driver's seat area. Hence, even if the short-distance radio transmit-receive device is built into the electronic control unit, it was difficult to perform radio communication with the radio communication means in the driver's seat area, which conventionally required a communication line between the electronic control unit and the radio communication means. However, in the sixth and the seventh embodiment, it is possible to eliminate the need for the communication line between the electronic control unit and the radio communication means by installing the short-distance radio transmit-receive device, which is connected to the control system LAN, in the driver's seat area.

Figure 9:
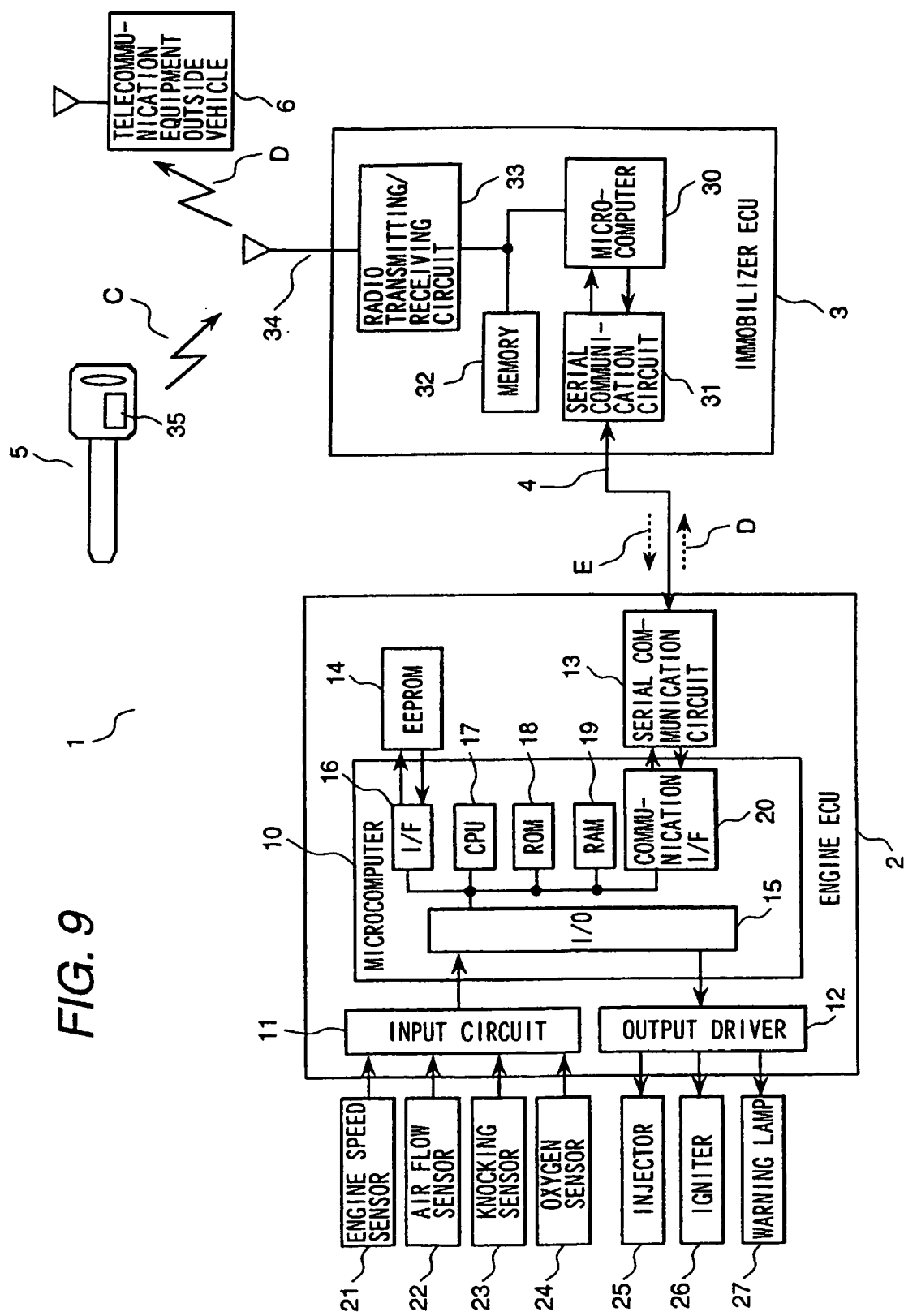
FIG. 9 illustrates a vehicle diagnostic system according to the eighth embodiment of the present invention.

In FIG. 9, it is assumed that an antitheft control unit for vehicle (hereinafter referred to as immobilizer ECU) or a control unit for keyless engine starting is used as the radio communication means for transmitting the vehicle diagnostic information. This embodiment is described in detail by exemplifying the immobilizer ECU as the radio communication means as below.

The immobilizer ECU 77 receives a radio signal C of an ID code specific to each vehicle, which is transmitted from a transmitter 35 of an ignition key S, through the antenna 34. The immobilizer ECU 77 then demodulates this received signal by the radio transmitting/receiving circuit 33, and compares the demodulated signal with a collation code stored in a memory 32 using the microcomputer 30. If the transmitted ID code is the same as the collation code, the immobilizer ECU 77 transmits an engine-operation enable signal E to the engine ECU 2 through a serial communication circuit 31. This engine-operation enable signal E differs at each engine starting. When receiving this signal via the serial communication circuit 13, an engine ECU 2 compares the signal with a corresponding code from among a plurality of codes stored in the EEPROM 14. As a result of the comparison, only if both are the same, the injector 25 and the igniter 26 are driven to start the engine.

While the vehicle is traveling, the engine ECU 2 controls the vehicle equipment as described above, diagnoses a state of the vehicle equipment according to signals obtained from sensors such as the knocking sensor 23 and the oxygen sensor 24, and then stores diagnostic information of this vehicle equipment in the RAM 19 as a code corresponding to the diagnostic result.

When a failure occurs in the vehicle equipment, the engine ECU 2 lights up the warning lamp 27 to inform the operator that the failure has occurred, and thereby requests the operator to carry out repairs. Then, the engine ECU 2 transmits the vehicle diagnostic information D, which is stored in the RAM 19, to the immobilizer ECU 77 through the serial communication line 4. The immobilizer ECU 77 high-frequency-modulates the diagnostic information D using the radio transmitting/receiving circuit 33 and radio-transmits the diagnostic information D from the antenna 34 to the telecommunication equipment outside vehicle 6 as a diagnostic information signal.

Also, by building the immobilizer system, which is shown in this embodiment, into the on-vehicle information equipment shown in the fifth embodiment, the ID code from the ignition key may be received using the radio communication means contained in this on-vehicle information equipment.

Figure 10:
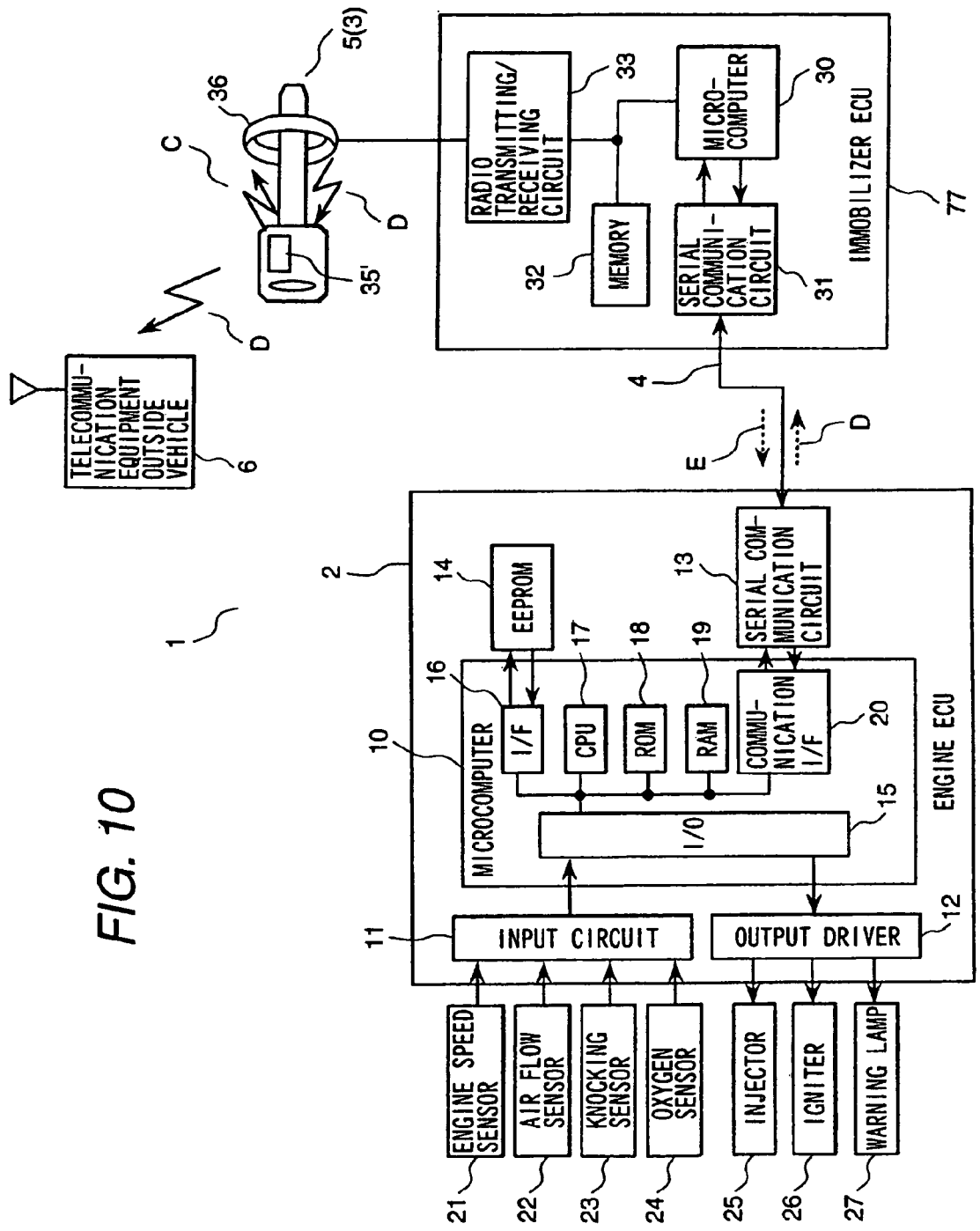
FIG. 10 illustrates a vehicle diagnostic system according to the ninth embodiment of the present invention.

In FIG. 10, an antenna connected to the immobilizer ECU 77 is a transmit-receive coil in a key cylinder. If there is an antenna inside this key cylinder, radio transmission and reception with outside of the vehicle is difficult. Therefore, radio communication with outside of the vehicle is performed using the ignition key 5 as the radio communication means 3.

In this ignition key 5, a radio transmit-receive chip 35' is embedded. As is the case with the eighth embodiment, when the engine starts, the ignition key 5 transmits the ID code C to the transmit-receive coil 36. In addition, in the event that a failure occurs in the vehicle equipment, this ignition key 5 receives the diagnostic information D, which is stored in the RAM 19 of the engine ECU 2, from the transmit-receive coil 36. Next, this ignition key 5 radio-transmits the diagnostic information D to the telecommunication equipment outside vehicle 6.

Figure 11:
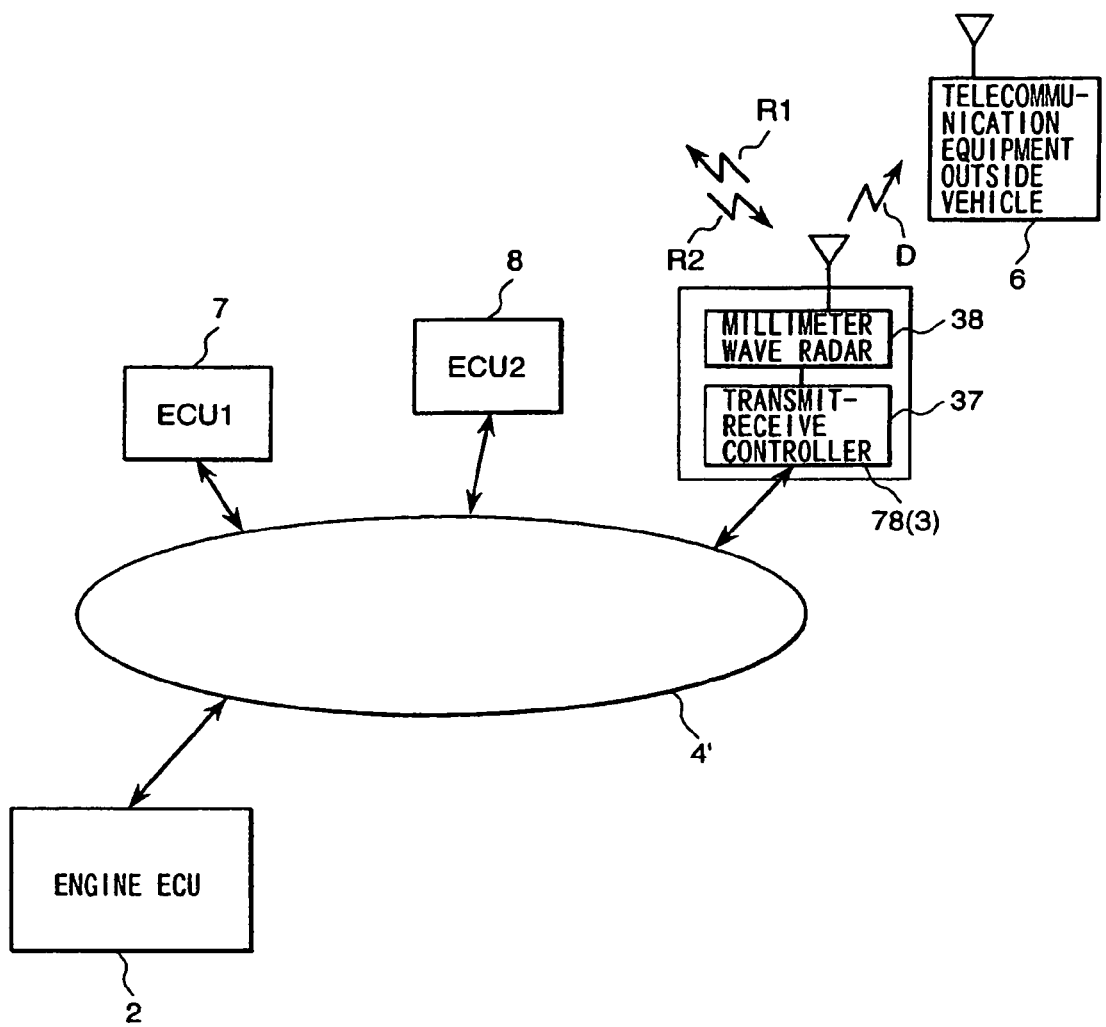
FIG. 11 illustrates a vehicle diagnostic system according to the tenth embodiment of the present invention.

In FIG. 11, the engine ECU 2, a first ECU 7 (for example, ECU for controlling an air bag), a second ECU 8 (for example, ECU for controlling transmission), and the millimeter-wave radar transmit-receive device 78 are mutually connected through the control system LAN inside vehicle. For example, they are connected through the multiple communication line 4' such as the CAN. The millimeter-wave radar transmit-receive device 78 comprises a transmit-receive controller 37 and a millimeter wave radar 38, and is used for an automatic follow-up traveling system of a vehicle, and the like.

The millimeter wave radar 38 transmits a detection wave R1 toward a vehicle traveling ahead, which is not shown in the figure and receives a reflection wave R2 from this vehicle. Moreover, when using the millimeter-wave radar transmit-receive device 78 as a vehicle diagnostic system, in the event of a failure of the vehicle equipment, the diagnostic information D stored in the engine ECU 2 is transmitted from the millimeter wave radar 38 to the telecommunication equipment 6 via the radio communication means 3 that is contained in the millimeter-wave radar transmit-receive device 78.

Figure 12:
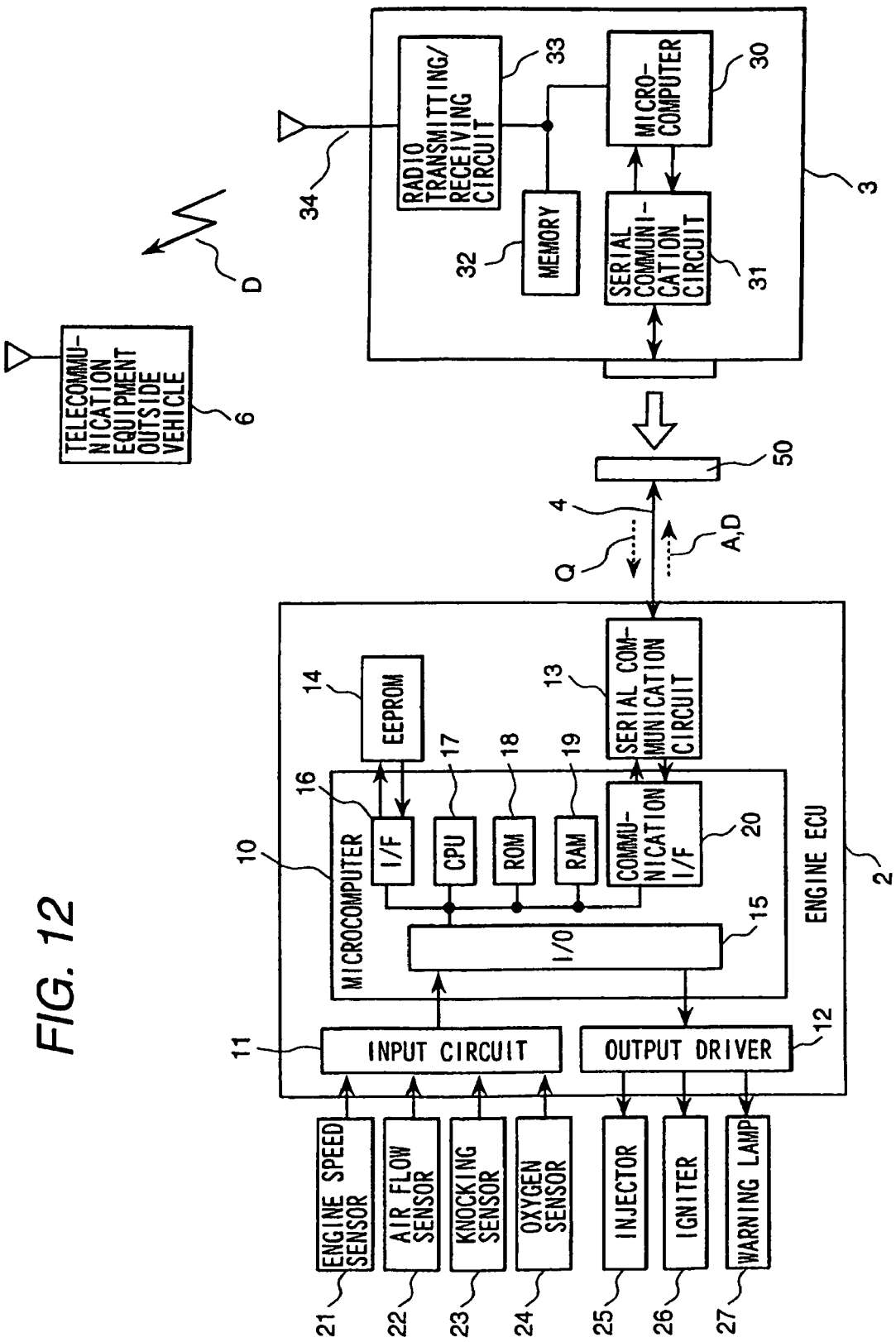
FIG. 12 illustrates a vehicle diagnostic system according to the eleventh embodiment of the present invention.

In FIG. 12, a vehicle diagnostic system that radio-transmits diagnostic information of a vehicle by connecting, for example, to a scan tool 50, which is already provided in the OBD II-ready vehicle, to the radio communication means 3 comprising a connector capable of fitting with this connector 50.

Configurations of the engine ECU 2 and the radio communication means 3, a method for transmitting diagnostic information of vehicle equipment, a method for checking whether or not communication between the engine ECU 2 and the radio communication means 3 are properly functional are the same as the first embodiment.

According to the eighth and the ninth embodiment, as is the case with the second, the third, and the fourth embodiment, the vehicle user may refuse to transmit diagnostic information of the vehicle equipment in spite of a failure in the vehicle equipment and break or remodel the vehicle diagnostic purposely. For example, if the operator carries causes undue influence, for example, breaking a communication line between the electronic control unit and the radio communication means, or removing or shielding the antenna of the radio communication means, it is possible to prevent the engine from starting to disable the vehicle from traveling. For example, in the eighth embodiment, the antenna 34, which is connected to the immobilizer ECU 77, also has a function of receiving the ID code C from the ignition key 5 in addition to a function of transmitting the diagnostic information D stored in the engine ECU 2. Hence, if the user removes or shields the antenna 34, it becomes impossible to start the engine. Moreover, even if the user breaks the serial communication line 4, the engine-operation enable signal E is not sent to the engine ECU 2, which also disables the engine from starting.

In addition, using the existing communication line and the radio communication means in the vehicle, which are contained in an immobilizer system, a keyless engine starting system, and the like, eliminates the need for a new communication line and a radio communication means, and also eliminates the need for vehicle assembly man-hour for laying the new communication line. Therefore, it is possible to construct a vehicle diagnostic system, which transmits the diagnostic information of the vehicle equipment by means of radio communication such as OBD III, at low cost.

Figure 13:
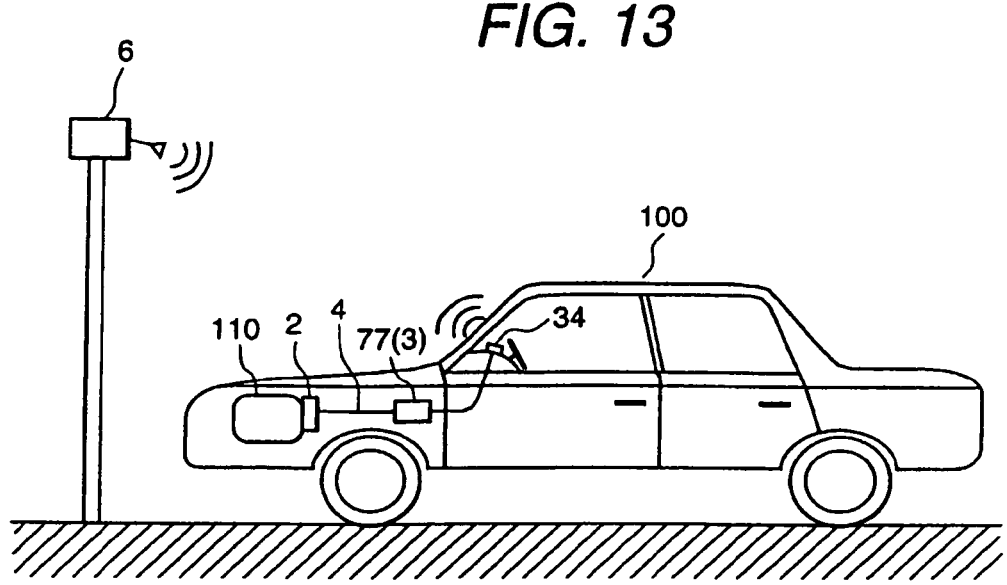
FIG. 13 is a schematic diagram illustrating a vehicle which is equipped with the vehicle diagnostic system of FIG. 9.

In FIG. 13, the vehicle 100 comprises an engine ECU 2 mounted on the engine 110, the immobilizer ECU or the control unit for keyless engine starting 77, which has the radio communication means 3, the communication line 4 for connecting them, and the antenna 34. FIG. 13 is an example showing that the antenna 34 is mounted on a dashboard of the vehicle 100, and that short distance communication with the telecommunication equipment 6 located on a road or a gas station is performed.

In this manner, in the case of short distance communication, even an antenna having a low power output is sufficiently capable of communication. Therefore, the antenna of the existing immobilizer system or the antenna of the keyless engine starting system can be used as it is. In addition, because it is possible to miniaturize the radio transmit-receive chip 35' that is built into the ignition key in the ninth embodiment, transmission of the diagnostic information from the ignition key 5 also becomes possible.

Figure 14:
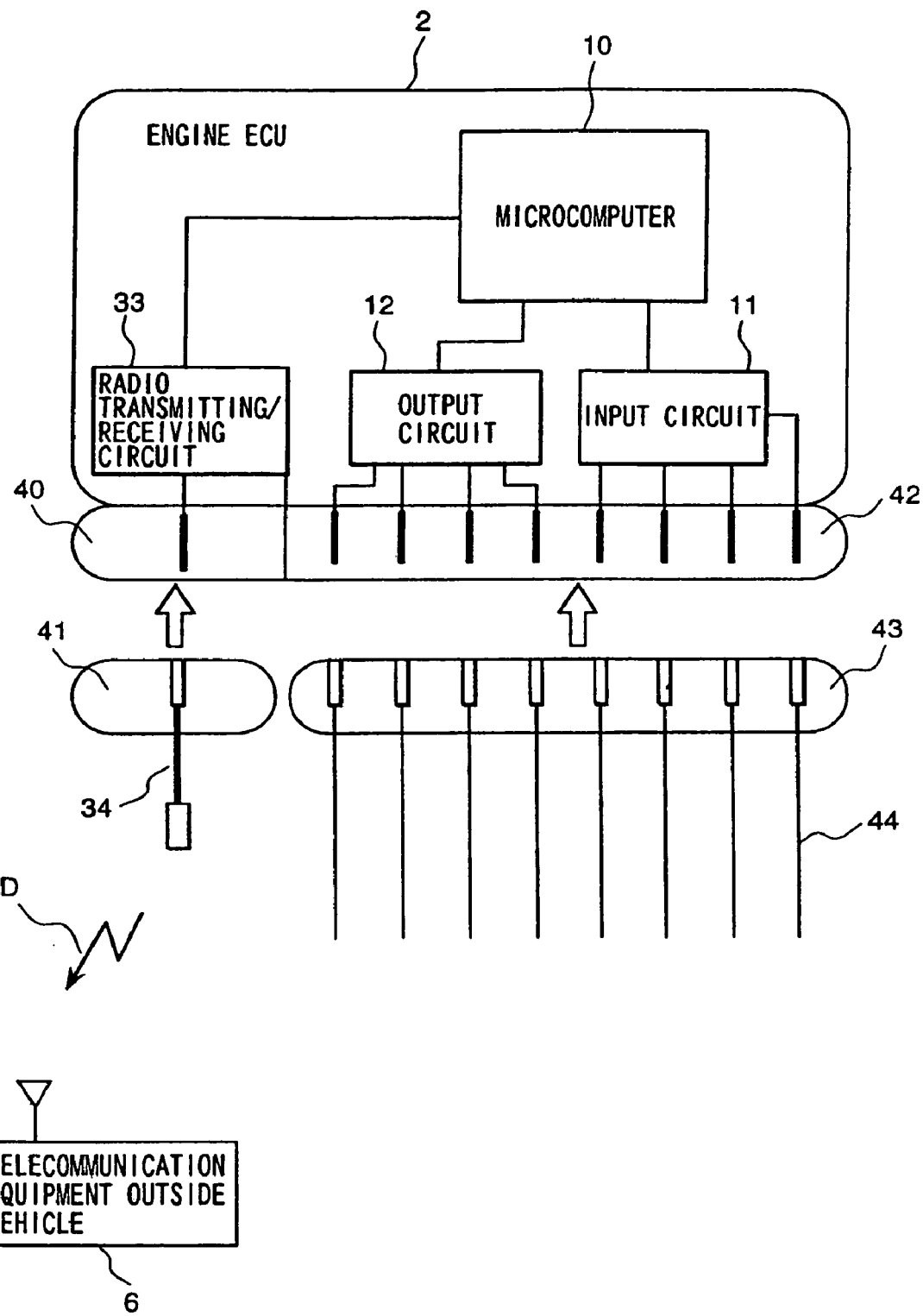
FIG. 14 illustrates a vehicle diagnostic system according to the twelfth embodiment of the present invention.

FIG. 14 shows a configuration of an engine ECU 2 in a case where the engine ECU 2 itself is provided with a radio communication means for radio-transmitting the diagnostic information of the vehicle equipment to outside of the vehicle. Besides a connector for harness 42 for fitting with a connector 43 that is connected to various signal harnesses 44, the engine ECU 2 comprises a connector for antenna 40 for fitting with a connector 41 that is connected to the antenna 34. Additionally, the engine ECU 2 is equipped with the radio transmitting/receiving circuit 33, which modulates or demodulates a radio transmit-receive signal of the antenna 34 that is fitted with the connector for antenna 40.

In the event that a failure occurs in the vehicle equipment, or when receiving a diagnostic information request signal from the telecommunication equipment outside vehicle 6, the diagnostic information D stored in the engine ECU 2 is radio-transmitted to the telecommunication equipment 6 directly from the engine ECU 2. Hence, in this embodiment, the radio transmitting/receiving circuit 33 is mounted on a substrate of the engine ECU 2. However, a configuration, in which the radio transmitting/receiving circuit 33 is built into the antenna-side connector 41 or built into the connector for antenna 40 on the engine ECU side, is also possible. Moreover, a Bluetooth module for short distance radio communication, and the like, may also be used for the radio transmitting/receiving circuit.

In addition, in this embodiment, by locating the engine ECU itself in an engine room, specifically, in the engine ECU where nobody can remove or access the engine ECU unless it is done in a repair shop, or the like, it becomes possible to prevent undue influence by the vehicle operator, an unfair practice including removal of the radio communication means installed in the engine ECU.

Additionally, in this embodiment, because the engine ECU is provided with the radio communication means, the communication line, which connects between the engine ECU and the radio communication means, becomes unnecessary. In addition, from the viewpoint of implementation, configuring an antenna having a connector, or an antenna and a radio transmitting/receiving circuits separately from the engine ECU, as shown in this embodiment, permits the radio communication means to be attached to the engine ECU easily.

Figure 15:
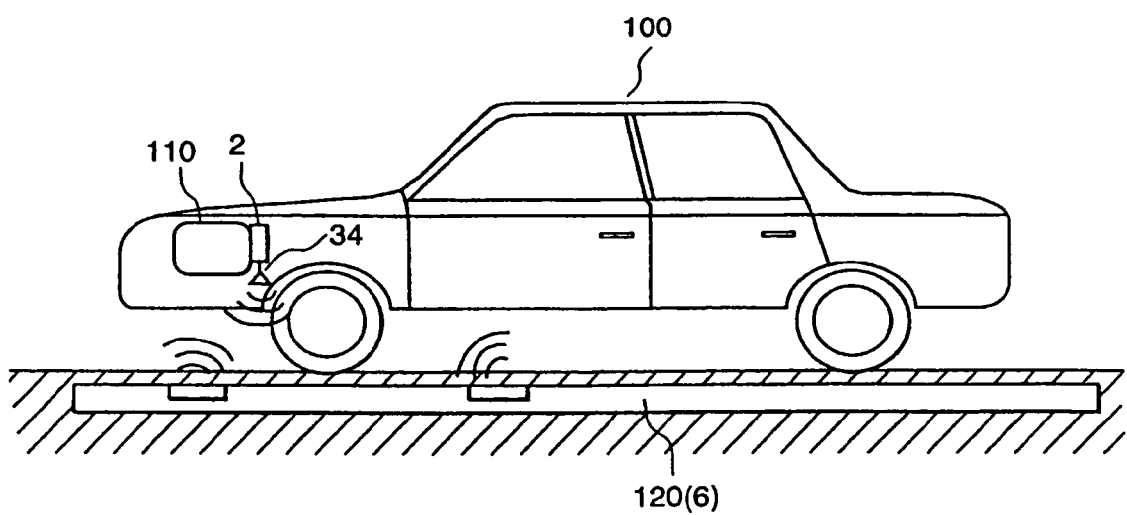
FIG. 15 is a schematic diagram illustrating a vehicle which is equipped with the vehicle diagnostic system of FIG. 14.

FIG. 15 illustrates a vehicle 100, having an antenna 34 located on the engine ECU 2 that is mounted on the engine 110. A radio signal is transmitted to and received from the telecommunication equipment using this antenna 34. In this embodiment, for the purpose of reducing vehicle assembly man-hour and reducing cost and weight of a signal harness as described above, the engine ECU is installed not in the conventional driver's seat area but in the engine room. Hence, in FIG. 15, the antenna 34 faces toward a road so as to perform short-distance communication. In this case, coaxial cable (a leakage) 120, which is laid under a road, or in the vicinity of an oiling device of a gas station, or the like, may be used for radio communication equipment outside vehicle 6. Additionally, because of short-distance communication, even an antenna having a low power output is sufficiently capable of communication, which enables us to transmit the vehicle diagnostic information at low cost.

Figure 16:
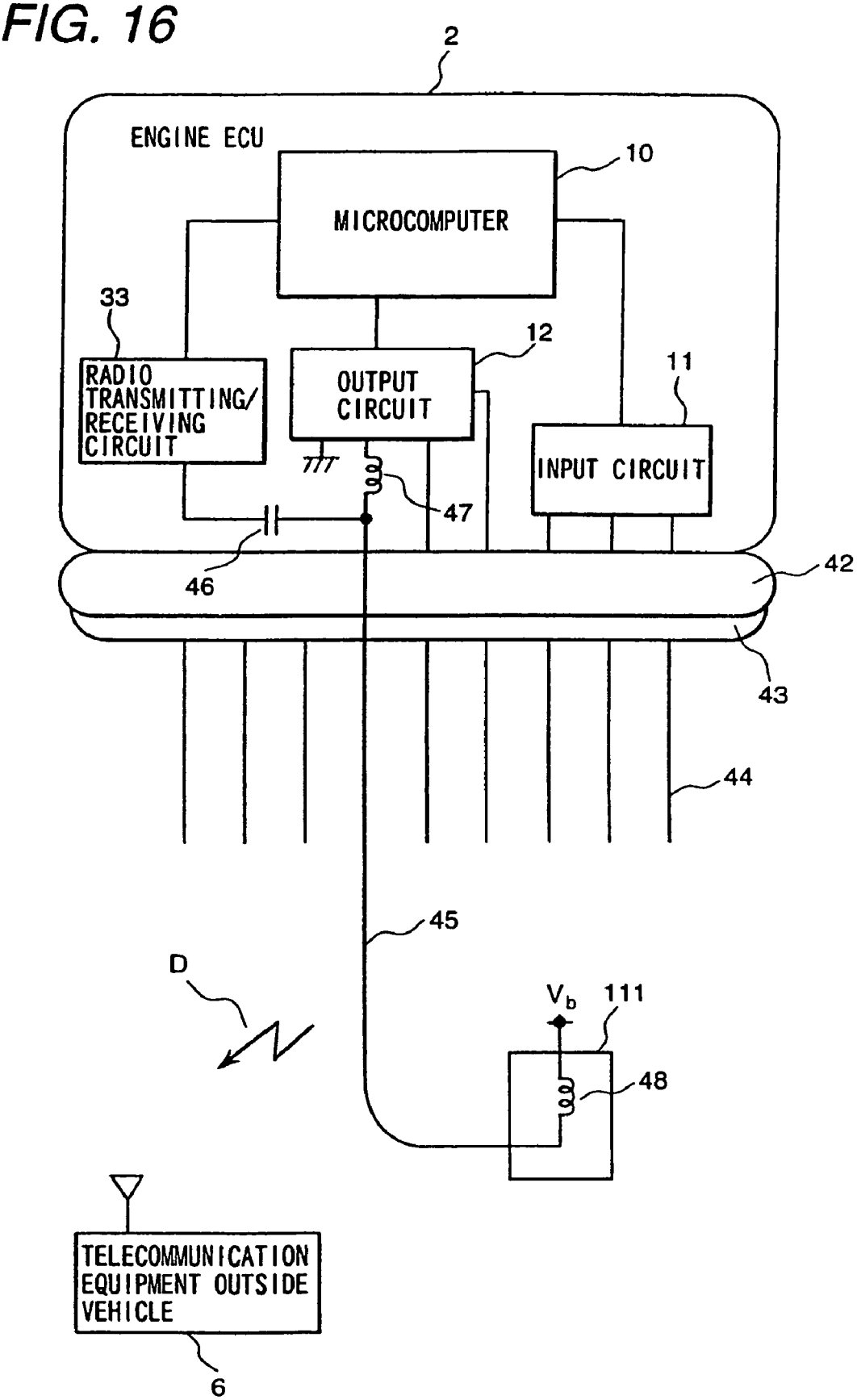
FIG. 16 illustrates a vehicle diagnostic system according to the thirteenth embodiment of the present invention.

FIG. 16 illustrates the use of a harness, which connects the engine ECU to the vehicle equipment, as an antenna. In this figure, the diagnostic information is radio-transmitted to the telecommunication equipment 6 by: the radio transmitting/receiving circuit 33 of the engine ECU 2 which modulates the diagnostic information D of the vehicle equipment, which has been transmitted by the microcomputer 10. Then the radio transmitting/receiving circuit 33 passes a high-frequency current through a harness 45 as an antenna via a low-frequency signal decoupling capacitor 46. In addition, when receiving a signal, the radio transmitting/receiving circuit 33 demodulates a high-frequency current generated in the harness 45. This harness 45 is also used as a current path functioned when passing a current through a solenoid 48 of an actuator 111 via an output circuit 12. However, because a frequency of the current for this load is sufficiently low as compared with a frequency of said high-frequency current, the harness 45 can have both of an antenna function and the function of passing a current through the solenoid.

In this connection, as shown in FIG. 16, providing a coil 47 between a junction point (between the radio transmitting/receiving circuit 33 and the output circuits 12) and the output circuits 12 enables efficient radio transmission and reception without passing a high-frequency current to a battery and ground. Moreover, in this embodiment, although the harness 45 connected to the output circuits 12 is treated as an antenna, the harness connected to the input circuit 11 may also be used as an antenna. In this case, or if a load of the output circuits 12 is not a coil, inserting the coil into an appropriate position of the harness 45 enables efficient transmission and reception as described above.

In addition, in this embodiment, as is the case with the twelfth embodiment, by locating the engine ECU itself in the engine room, specifically, in the engine ECU in a place where nobody can access it unless it is done in a repair shop, or the like, it becomes possible to prevent an undue influence including removal of the radio communication means installed in the engine ECU. In addition, for example, if harnesses, which input signals of an engine crank-angle sensor and a cam sensor, are used as antennas, breaking these harnesses prevents the engine from being properly controlled, which disables the vehicle from traveling.

Furthermore, not only the communication line, which is connected between the engine ECU and the radio communication means, but also the antenna for transmitting the diagnostic information of the vehicle equipment becomes unnecessary. Therefore, it is possible to construct a vehicle diagnostic system, which transmits the diagnostic information of the vehicle equipment to outside of the vehicle by means of radio communication such as OBD III, at low cost.

FIG. 17 illustrates a vehicle 100 which transmits and receives a radio signal to and from the telecommunication equipment 6 using the harness 45 that connects sensors or the actuator 111 (such as for example an oxygen sensor, a heater for heating the oxygen sensor, and a solenoid for purging a canister) to the engine ECU 2 mounted on the engine 110. Because this harness 45 is located at a lower part of the vehicle, as is the case with FIG. 6, the leakage coaxial cable 120, which is laid under the road, or in the vicinity of the oiling device of the gas station, or the like, is used for the radio communication equipment 6.

Another embodiment is described with reference to FIG. 18. In this case, the vehicle diagnostic information is not transmitted directly to a base station, a monitor station, or the like by means of long-distance communication. As shown in FIG. 13, FIG. 15, or FIG. 17, the diagnostic information of the vehicle equipment is transmitted from the vehicle 100, which is equipped with a vehicle diagnostic system that performs short-distance communication, to the base station, the monitor station, or the like.

FIG. 18 shows a vehicle 100 on the left side which is equipped with the vehicle diagnostic system according to the eighth embodiment shown in FIG. 9. The vehicle 100 radio-transmits the diagnostic information of the vehicle equipment to the telecommunication equipment outside vehicle 6 installed in a oiling machine 200.

Further, a vehicle 100' on the right side is equipped with the vehicle diagnostic system according to the twelfth embodiment shown in FIG. 14. The vehicle 100' radio-transmits the diagnostic information of the vehicle equipment to the leakage coaxial cable 120 that is laid under a road in the vicinity of the oiling machine 200, and which serves as the telecommunication equipment 6. In either case, as soon as a sensor, which is not shown in the figure, detects that the vehicle 100 stopped in front of the oiling machine 200, or that oil supply is started, a diagnostic information request signal is transmitted from the telecommunication equipment 6 to the vehicle 100. In response, transmission of the diagnostic information from the vehicle 100 to the telecommunication equipment 6 is started. In this connection, only if there is a failure in the vehicle equipment, the diagnostic information may be transmitted from the vehicle side to the telecommunication equipment. Moreover, as regards the gas station, if no response is received from the vehicle 100 in response to the diagnostic information request signal, which has been transmitted from the telecommunication equipment outside vehicle 6 to the vehicle 100, due to an unfair practice such as removal of an antenna, it is possible to take measures such as stopping oil supply for example.

Next, the diagnostic information of each vehicle 100 is demodulated by a radio transmitting/receiving circuit 210 of the telecommunication equipment 6, and then transmitted to a computer 220 installed in a store, an office, or the like in the gas station. The diagnostic information of the vehicle equipment concerning each vehicle 100 collected in this computer 220 is transmitted to a server 240 in the base station, the monitor station, or the like, through Internet 230.

According to the present invention, a vehicle diagnostic system comprises: an electronic control unit for controlling vehicle equipment and for diagnosing the vehicle equipment and a radio communication means comprising a radio transmission circuit and an antenna, for transmitting diagnostic information of the vehicle equipment to a radio communication equipment wherein a determination is made whether or not the communication between the electronic control unit and the radio communication means is being performed normally. Hence, it is. possible to detect a failure of the vehicle diagnostic system itself or abnormality of the vehicle diagnostic system caused by a vehicle operator's undue influence and warn the vehicle operator or notify the abnormality of the vehicle diagnostic system to the telecommunication equipment.

Moreover, using a vehicle's existing communication line or a vehicle's existing radio communication means, which is contained in on-vehicle information equipment, a vehicle antitheft system, a keyless engine starting system, a millimeter-wave radar transmit-receive device, and the like, eliminates the need for a communication line or a radio communication means, which is specifically intended for OBD III, or the like and also eliminates the need for vehicle assembly man-hour for laying the new communication line. Therefore, it is possible to construct a vehicle diagnostic system, which transmits the diagnostic information of the vehicle equipment to outside of the vehicle by means of radio communication such as OBD III at low cost. Furthermore, building the radio communication means into the electronic control unit, or connecting the radio communication means to an external scan-tool connector for reading the diagnostic information of the vehicle also eliminates the need for vehicle assembly man-hour for a new communication line and for laying the communication line. In addition, using a harness, which connects the electronic control unit to the vehicle equipment, as an antenna eliminates the need for adding an antenna.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A vehicle diagnostic system comprising:
    an electronic control unit for controlling and monitoring vehicle equipment;
    a radio communication means for communicating between the electronic control unit on said vehicle and a telecommunication equipment, and for transmitting a communication diagnostic signal to said electronic control unit, and for receiving a response signal according to said communication diagnostic signal from the electronic control unit, the telecommunication equipment being outside the vehicle and receiving a communication from the radio communication means;
    a communication line for connecting said electronic control unit and said radio communication means,
    wherein at least the communication diagnostic signal is communicated to said electronic control unit through said communication line, and
    wherein said radio communication means transmits said communication diagnostic signal to said electronic control unit as necessary and in response, said electronic control unit sends back the response signal to said radio communication means; and said radio communication means utilizes the response signal to determine whether or not the communicating through said communication line is being performed normally.

2. The system of claim 1 wherein if said communication line is determined not to be properly functional a notification signal is transmitted to said telecommunication equipment by said radio communication means.

3. The system of claim 2 wherein said notification signal is returned back to said radio communication means by said telecommunication equipment and compared to said transmitted notification signal to determine if said radio communication means is properly functional.

4. The system of claim 1 wherein if said communication line is determined not to be properly functional a notification signal is transmitted to a vehicle operator by said radio communication means.

5. The system of claim 4 wherein if said communication line is determined not to be properly functional for a predetermined period of time said system disables said vehicle from operation.

6. The system of claim 1 wherein said communication line is a serial communication circuit.

7. The system of claim 1 wherein said radio communication means is included in an on-vehicle information equipment.

8. The system of claim 1 wherein said radio communication means is included in a cellular phone.

9. The system of claim 1 wherein said radio communication means is included in a vehicle anti-theft system.

10. The system of claim 9 wherein said vehicle anti-theft system utilizes an ignition key as said radio communication means.

11. The system of claim 1 wherein said radio communication means is included in a keyless engine starting system.

12. The system of claim 11 wherein said keyless engine starting system utilizes an ignition key as said radio communication means.

13. The system of claim 1 wherein said radio communication means is included in a radar device.

14. The system of claim 1 wherein said radio communication means is capable of connecting to an external scan-tool connector.

15. The system of claim 1 wherein said radio communication means is provided in an engine compartment of a vehicle.

16. The system of claim 1 wherein said system utilizes a harness which connects said electronic control unit to said vehicle equipment as an antenna for transmitting a notification signal.

17. The system of claim 1 wherein said telecommunication equipment is located on a road.

18. The system of claim 1 wherein said system complies with an On Board Diagnosis III system.

19. The system of claim 1 wherein said communication is transmitted through the internet.

* * * * *